United States Patent
Matsunami et al.

(10) Patent No.: US 10,358,058 B2
(45) Date of Patent: Jul. 23, 2019

(54) GAP HIDING STRUCTURE FOR VEHICLE LUGGAGE FLOOR

(71) Applicant: TOYOTA BOSHOKU KABUSHIKI KAISHA, Aichi-ken (JP)

(72) Inventors: Nobutaka Matsunami, Aichi-ken (JP); Junichiro Nozue, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/935,332

(22) Filed: Mar. 26, 2018

(65) Prior Publication Data

US 2018/0281688 A1 Oct. 4, 2018

(30) Foreign Application Priority Data

Apr. 3, 2017 (JP) .................................. 2017-073596

(51) Int. Cl.
*B60N 2/10* (2006.01)
*B60N 2/30* (2006.01)
*B60R 13/01* (2006.01)
*B60N 2/36* (2006.01)

(52) U.S. Cl.
CPC .......... *B60N 2/3065* (2013.01); *B60N 2/3011* (2013.01); *B60R 13/013* (2013.01); *B60N 2002/363* (2013.01)

(58) Field of Classification Search
CPC ............ B60N 2002/32; B60N 2002/36; B60N 2002/363; B60N 2/3065; B60N 2/3011; B60N 2/3013; B60R 13/013

USPC .......................... 296/65.05, 65.09, 65.16, 69
See application file for complete search history.

(56) References Cited

U.S. PATENT DOCUMENTS

| | | | | |
|---|---|---|---|---|
| 2,949,331 A | * | 8/1960 | Himka | ................. B60N 2/3031 296/66 |
| 3,121,585 A | * | 2/1964 | Krueger | ............... B60N 2/3011 296/37.16 |

FOREIGN PATENT DOCUMENTS

| | | | | |
|---|---|---|---|---|
| DE | 10332375 A1 | * | 2/2005 | ............... B60N 2/06 |
| DE | 102008025333 A1 | * | 12/2009 | ............... B60N 2/06 |
| EP | 2177397 B1 | * | 1/2014 | ............ B60N 2/3011 |
| JP | 2014-004881 | | 1/2014 | |

* cited by examiner

*Primary Examiner* — Dennis H Pedder
(74) *Attorney, Agent, or Firm* — Greenblum & Bernstein, P.L.C.

(57) ABSTRACT

A gap hiding structure for a vehicle luggage floor including: a gap hiding board hinged to the vehicle luggage floor and configured to cover a gap between the luggage floor and a seat; a rear tilt down mechanism configured to cause the entire seat to be sunk from a use position to an underfloor storage position with a forward tilting of a seat back; a first support surface portion configured to support the gap hiding board to be substantially flush with the luggage floor in the use position; and a second support surface portion configured to support the gap hiding board to be substantially flush with the luggage floor in the underfloor storage position; and a lifting mechanism configured to push up the gap hiding board avoiding interference with the second support surface portion by lifting the first support surface portion according to a rearward movement of the seat.

5 Claims, 7 Drawing Sheets

GAP HIDING STRUCTURE FOR VEHICLE LUGGAGE FLOOR

CROSS-REFERENCE TO RELATED APPLICATIONS

This application claims priority from Japanese Patent Application No. 2017-073596 filed on Apr. 3, 2017, the entire contents of which are incorporated herein by reference.

TECHNICAL FIELD

The disclosure relates to a gap hiding structure for a vehicle luggage floor. Specifically, the disclosure relates to a gap hiding structure for a vehicle luggage floor that includes a gap hiding board hinged to a vehicle luggage floor and covering a gap between the luggage floor and a seat installed on the front side of the luggage floor, and a support part installed in the seat and configured to contact and support the gap hiding board.

BACKGROUND

There is known a configuration in which a gap hiding board hiding a gap between a rear seat and a luggage floor of an automobile is hinged to a front end of the luggage floor (JP-A-2014-4881). The gap hiding board is normally brought into a state by biasing in which it stands obliquely against a rear surface of a seat back of the rear seat described above. The gap hiding board is configured to follow the movement in which a backrest angle of the seat back is changed.

In the configuration in which the gap hiding board stands obliquely against the rear surface of the seat back as in the above-described prior art, a luggage space becomes narrower by the overhang of the gap hiding board.

SUMMARY

An object to be achieved by the disclosure is to cause a gap hiding board covering a gap between a vehicle luggage floor and an underfloor storage type seat installed on the front side of the luggage floor to follow a movement of the seat so as to be substantially flush with the luggage floor in a deployed state and a stored state of the seat.

A first aspect of the present disclosure is a gap hiding structure for a vehicle luggage floor including: a gap hiding board hinged to the vehicle luggage floor and configured to cover a gap between the luggage floor and a seat installed on a front side of the luggage floor; a rear tilt down mechanism configured to cause the entire seat to be sunk from a use position where the seat is used as a seating part to an underfloor storage position where the seat enters a lower side of the gap hiding board with a forward tilting of a seat back; a support part configured to come into contact with and support the gap hiding board, the support part including: a first support surface portion which forms a substantially horizontal plane, and which is configured to come into contact with the gap hiding board from the lower side of the gap hiding board and supports the gap hiding board to be substantially flush with the luggage floor in a state where the seat is in the use position; and a second support surface portion which is provided at a rear surface portion of the seat back, wherein when the seat is in the use position, the second support surface portion forms a standing surface, and when the seat is in the underfloor storage position, the second support surface portion forms a substantially horizontal plane, is configured to come into contact with the gap hiding board from the lower side of the gap hiding board and support the gap hiding board to be substantially flush with the luggage floor; and a lifting mechanism configured to push up the gap hiding board to a high position at which the gap hiding board is capable of avoiding interference with the second support surface portion by bringing the first support surface portion close to a rotation center of the gap hiding board while lifting the first support surface portion in a substantially horizontal manner according to a rearward movement of the seat toward the underfloor storage position.

DETAILED DESCRIPTION

Hereinafter, an embodiment for carrying out the disclosure will be described with reference to the drawings.

First Embodiment

Figure 1:
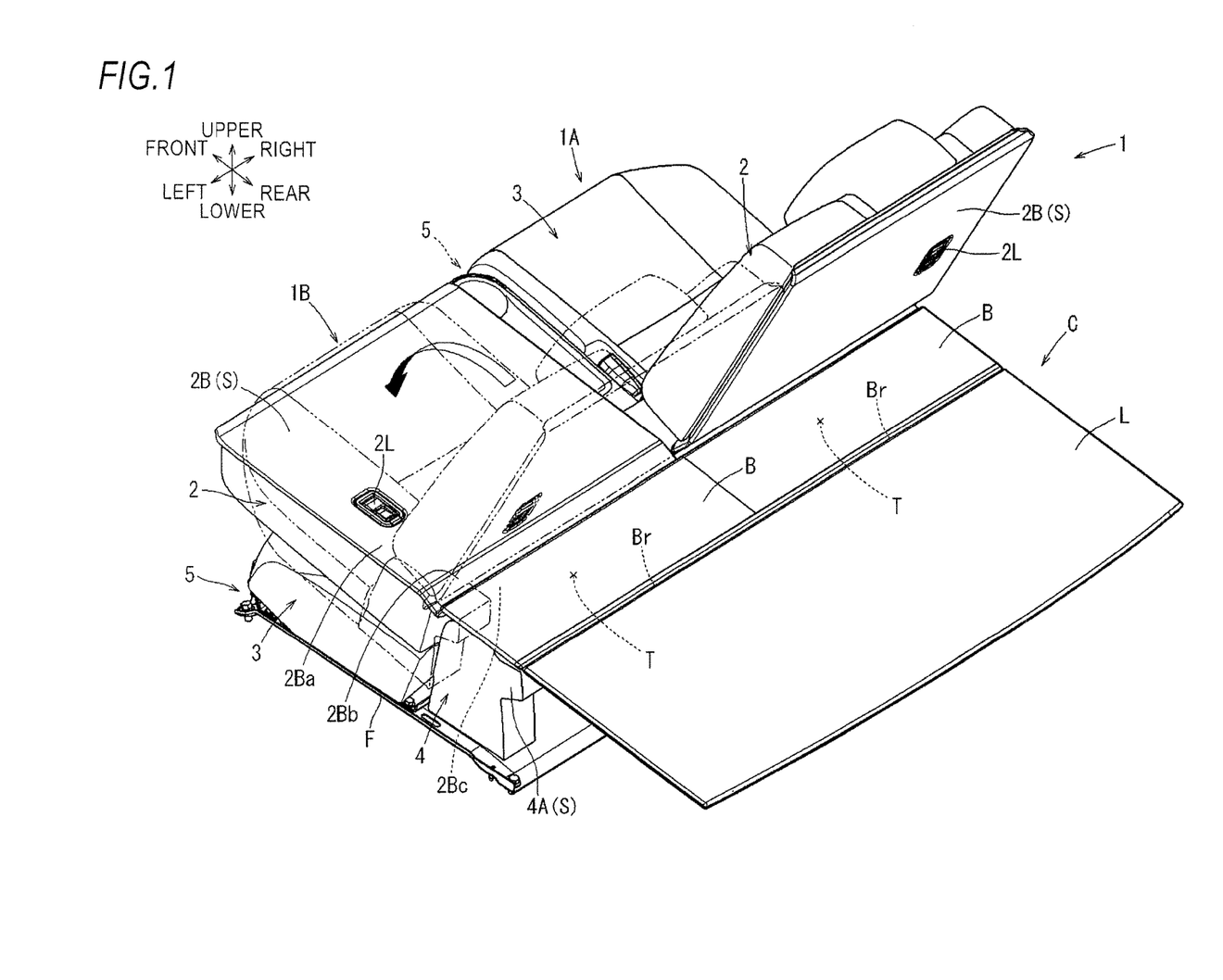
FIG. 1 is a perspective view showing a schematic configuration of a gap hiding structure for a vehicle luggage floor according to a first embodiment.

First, a configuration of a gap hiding structure C (gap hiding structure for vehicle luggage floor) according to a first embodiment will be described with reference to FIGS. 1 to 7. In the following description, the directions such as a front and rear direction, an upper and lower direction and a right and left direction refer to the respective directions as indicated in each of the drawings. As shown in FIG. 1, the gap hiding structure C of the present embodiment has a structure in which a gap T formed between a rear seat 1 at a rearmost row of an automobile with three-row seats and a luggage floor L on the rear side thereof can be covered and hidden with good appearance by a pair of left and right gap hiding boards B hinged to a front end of the luggage floor L. Here, the above-described rear seat 1 corresponds to the seat of the disclosure.

Each gap hiding board B is configured in such a manner that a surface material extending in a single connection from a carpet material laid on the luggage floor L is covered in a state of being integrally adhered to a resin plate material (not shown). A hinge portion (integral hinge) extends in a vehicle width direction and connects the luggage floor L and the gap hiding boards B to each other. Each gap hiding board B is installed in a state of being rotatable in a height direction with respect to the luggage floor L with the hinge portion as a rotation center Br. Each gap hiding board B is come into contact with and supported against each of left and right divided seats 1A, 1B constituting the rear seat 1 (to be described later) and is configured to separately cover each of the gaps T formed between the divided seats 1A, 1B and the luggage floor L.

The rear seat 1 includes two divided seats 1A, 1B which are divided by 5:5 in the left and right direction. Each of the divided seats 1A, 1B includes a seat back 2 serving as a backrest of a seated person and a seat cushion 3 serving as a seating part, respectively. Each of the divided seats 1A, 1B includes a rear tilt down mechanism 5, respectively. Each of the rear tilt down mechanisms 5 can store each of the divided seats 1A, 1B in such a manner that the divided seats 1A, 1B are folded and sunk rearward from a use position where each of the divided seats 1A, 1B is individually used as a seating part to an underfloor storage position on the front lower side of the luggage floor L.

Each of the rear tilt down mechanisms 5 normally holds each of the divided seats 1A, 1B in a state of being fixed at the use position. However, each rear tilt down mechanism 5 is operated such that each of the divided seats 1A, 1B is folded and sunk to the underfloor storage position by operating a release lever 2L installed on a rear surface portion 2B of the seat back 2. With the above configuration, when each of the divided seats 1A, 1B of the rear seat 1 is folded and sunk to the underfloor storage position, the rear surface portion 2B of the folded seat back 2 is substantially flush with the luggage floor L, so that a luggage space can be expanded.

Specifically, in the rear seat 1, seat arrangement can be performed in such a manner that both of the divided seats 1A, 1B are sunk to the underfloor storage position, or only one of the divided seats 1A, 1B is sunk to the underfloor storage position while the other is left in the use position. However, since the divided seats 1A, 1B of the rear seat 1 described above can be brought into different positions on the left and right sides, the shapes of the gaps T formed between the divided seats 1A, 1B and the luggage floor L are different from each other on the left and right sides. Thereby, when condition of contacting the gap hiding boards B covering and hiding the gaps T with the divided seats 1A, 1B is changed, the posture of one of the gap hiding boards B with respect to the other is obliquely floated or sunk. Thus, there is a possibility that the gaps T cannot be covered with good appearance in such a manner of being substantially flush with the luggage floor L.

However, in the gap hiding structure C, even when the divided seats 1A, 1B described above are changed into different positions on the left and right sides in the use position and the underfloor storage position, the divided seats 1A, 1B on each side can be supported against the gap hiding boards B on each side substantially in the same contact manner. With the above configuration, even when the divided seats 1A, 1B are changed into the different position on the left and right sides, the gap hiding boards B on each side can cover the gaps T with good appearance in a state of being aligned on the left and right sides so as to be substantially flush with the luggage floor L.

Hereinafter, a specific configuration of the gap hiding structure C described above will be described in detail together with a configuration of the rear seat 1. First, a configuration of each of the divided seats 1A, 1B constituting the rear seat 1 will be described. That is, lower end portions on both left and right sides of the seat back 2 constituting a backrest part of each of the divided seats 1A, 1B are connected to rear end portions on both left and right sides of the seat cushion 3 via recliners (not shown) and supported, respectively.

By the above connection, the seat back 2 is held as a state in which it is fixed in a standing posture angle usable as a backrest with respect to the seat cushion 3 at the normal time where each of the divided seats 1A, 1B is in the use position (see the divided seat 1A on the right side in FIG. 1). However, as the divided seats 1A, 1B on each side are sunk rearward by the operation of the rear tilt down mechanism 5 (to be described later), the fixed state of the backrest angle of the seat back 2 by the recliner (not shown) described above is released in conjunction with the movement of the seats, and the seat back 2 is tilted forward so as to be folded on an upper surface portion of the seat cushion 3 with the center portion of the recliner (not shown) as a rotation center 2R (see the divided seat 1B on the left side in FIG. 1).

Figure 2:
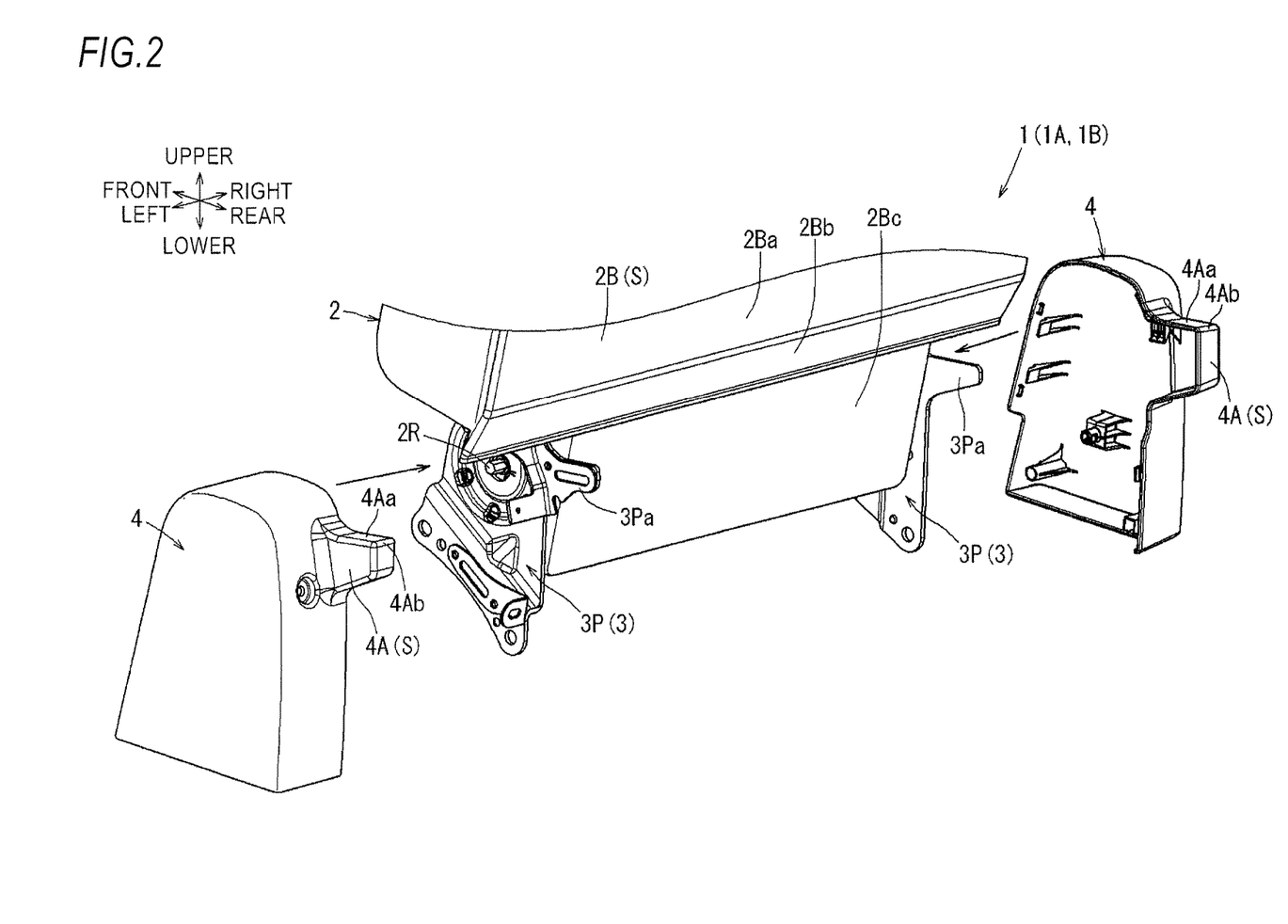
FIG. 2 is an exploded perspective view showing a state in which side shields are removed from a seat.

More specifically, as shown in FIG. 2, the lower end portions on both left and right sides of the seat back 2 are connected to inner portions of reclining plates 3P coupled to rear end portions of left and right side frames (not shown) of the seat cushion 3 via recliners (not shown). Further, each of the connecting portions between the lower end portions on both left and right sides of the seat back 2 and the rear end portions (reclining plates 3P) on both left and right sides of the seat cushion 3 is covered with respect to the outside by each of resin side shields 4 assembled to the reclining plates 3P from the outer side in a seat width direction.

Figure 3:
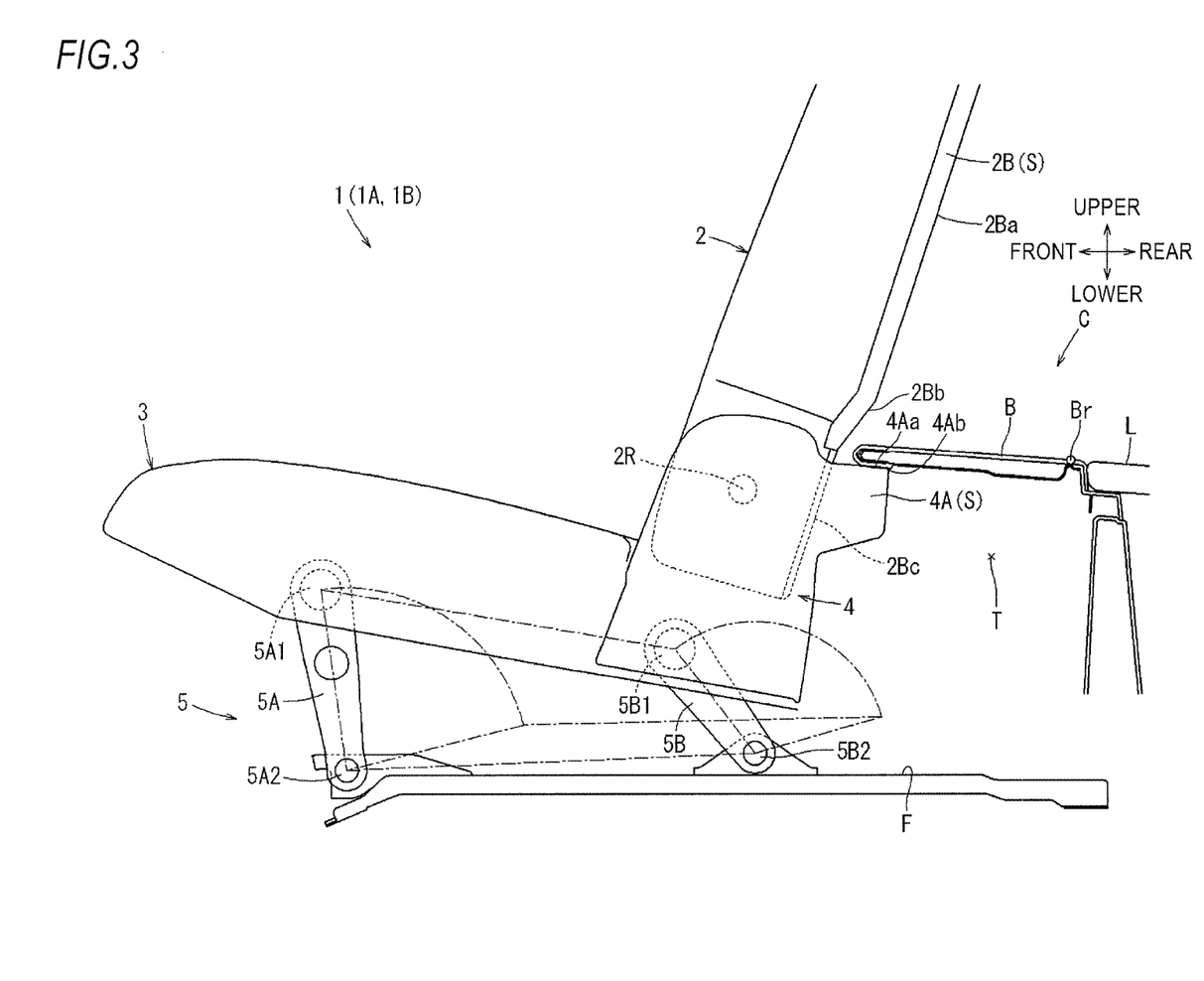
FIG. 3 is a side view showing a state in which the seat is in a use position.

Each side shields 4 is configured such that an overhang portion 4A protruding rearward in a horn shape is formed on a rear upper portion of each of the side shields 4. As shown in FIG. 3, an upper surface of each overhang portion 4A is configured as a first support surface 4Aa. When the divided seats 1A, 1B are in the use position, the first support surface 4Aa forms a substantially horizontal plane and comes into contact and supports the gap hiding board B from below.

As shown in FIG. 2, when the side shields 4 are respectively assembled to the reclining plates 3P from the outer side in the seat width direction, protrusions 3Pa formed in the reclining plates 3P and protruding rearward in a horn shape are set to the inside of the overhang portions 4A, and the overhang portions 4A are strongly supported from the inner side by the protrusions 3Pa. In this way, the overhang portions 4A of the side shields 4 can strongly support the gap hiding boards B from the lower side by the first support surfaces 4Aa that are upper surfaces of the overhang portions 4A, as shown in FIG. 3. Here, the overhang portions 4A described above correspond to the first support surface portion in the disclosure.

Figure 5:
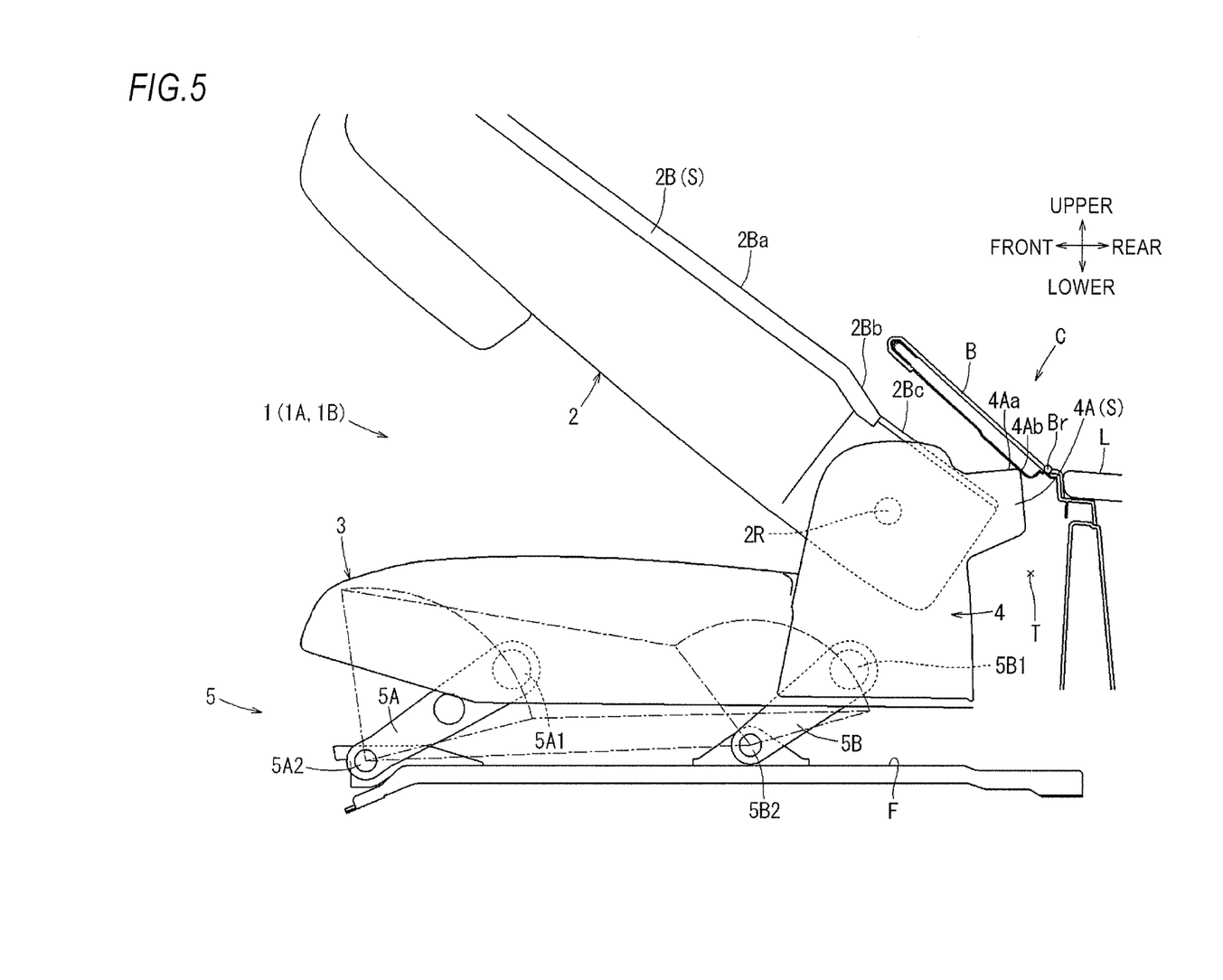
FIG. 5 is a side view showing a state in which the gap hiding board is pushed up by the first support surface portion by further backward movement of the seat toward the underfloor storage position.
Figure 6:
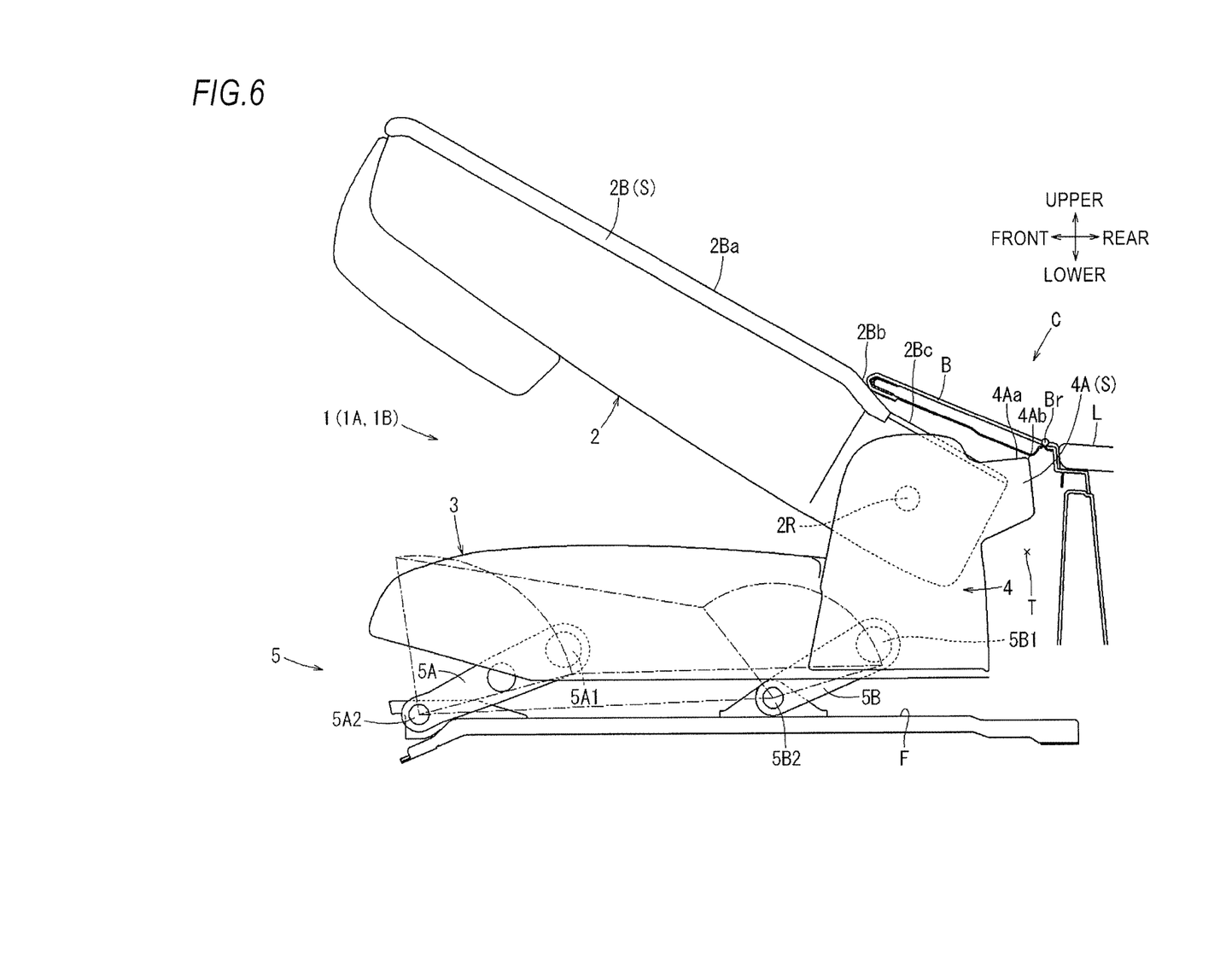
FIG. 6 is a side view showing a state in which the gap hiding board is descending in accordance with descent of the first support surface portion by further backward movement of the seat toward the underfloor storage position.
Figure 7:
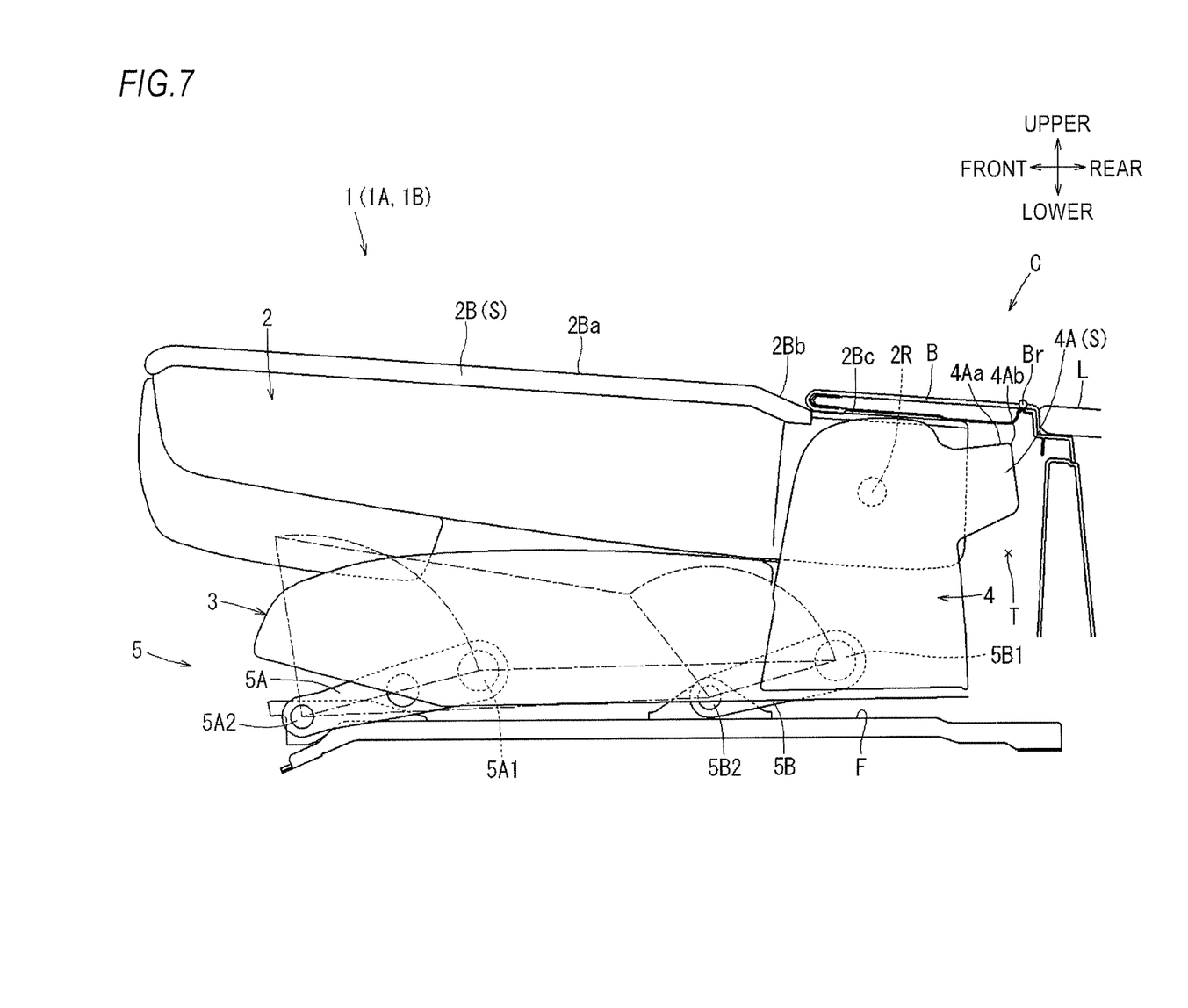
FIG. 7 is a side view showing a state in which the seat has moved to the underfloor storage position.

When the divided seats 1A, 1B on each side are sunk rearward from the use position described with reference to FIG. 3 by the operation of the rear tilt down mechanisms 5 (to be described later) as shown in FIGS. 4 to 7, the seat backs 2 are adapted to be folded on the upper surface portions of the seat cushions 3 in conjunction with the movement of the divided seats 1A, 1B. Further, as shown in FIG. 7, when the divided seats 1A, 1B are sunk to the underfloor storage position where the seat cushions 3 are substantially bottomed on an underfloor surface F on the front lower side of the luggage floor L, the seat backs 2 are folded on the upper surface portions of the seat cushions 3, and the rear surface portions 2B thereof are substantially flush with the luggage floor L.

Specifically, according to the folding described above, the seat back 2 is brought into a state in which a second support surface 2Bc of the rear surface portion 2B positioned directly above the rotation center 2R enters the lower side of each gap hiding board B to form a substantially horizontal plane and comes into contact with and supports the gap hiding board B from the lower side. More specifically, the second support surface 2Bc is adapted to support each gap hiding board B from the lower side at the same height position at which it has been supported by the first support surface 4Aa of the overhang portion 4A of each side shield 4 during the state of the use position described with reference to FIG. 3. Further, the seat back 2 is configured such that a general rear surface 2Ba of the rear surface portion 2B exposed to the upper side from a tip of each gap hiding board B is substantially flush with the upper surface of each gap hiding board B. Thereby, the rear surface portion 2B of the seat back 2 folded in the underfloor storage position and the luggage floor L are connected to each other via each gap hiding board B so as to be substantially flush with each other. Here, the rear surface portion 2B of the seat back 2 described above corresponds to the second support surface portion in the disclosure.

A step corresponding to a plate thickness of each gap hiding board B is formed between the general rear surface 2Ba and the second support surface 2Bc of the rear surface portion 2B of the seat back 2. An inclined surface 2Bb is formed between the general rear surface 2Ba and the second support surface 2Bc and the step is smoothed by the inclined surface 2Bb. The rear surface portion 2B of the seat back 2 is configured to have substantially the same rigidity as the luggage floor L by a resin backboard (not shown) attached substantially over its entire area.

Further, the rear surface portion 2B of the seat back 2 has the general rear surface 2Ba and the inclined surface 2Bb which are exposed to the outside when the seat back 2 is within the range to be moved between the use position shown in FIG. 3 and the underfloor storage position shown in FIG. 7. The same carpet material as the carpet material (not shown) laid on the luggage floor L is attached to the general rear surface 2Ba and the inclined surface 2Bb. When the seat back 2 is in the use position shown in FIG. 3, the second support surface 2Bc of the rear surface portion 2B of the seat back 2 is in a state of being extended downward from the first support surface 4Aa that is an upper surface of the overhang portion 4A of each side shield 4.

As shown in FIG. 3, the seat cushion 3 is connected to the underfloor surface F of the vehicle via the rear tilt down mechanism 5 in a state where the seat cushion 3 can be deployed and stored. The tilt down mechanism 5 has a configuration of a four-bar link mechanism that includes a pair of left and right front links 5A and a pair of left and right rear links 5B. Each front link 5A is configured in such a manner that an upper end portion and an lower end portion of each front link 5A are rotatably pin-connected to the seat cushion 3 and the underfloor surface F of the vehicle by connecting pins 5A1, 5A2 having axes oriented in the vehicle width direction, respectively. Further, each rear link 5B is configured in such a manner that an upper end portion and an lower end portion of each rear link 5B are rotatably pin-connected to the seat cushion 3 and the underfloor surface F of the vehicle by connecting pins 5B1, 5B2 having axes oriented in the vehicle width direction, respectively.

Each front link 5A is configured to have a link length longer than each rear link 5B. As shown in FIG. 3, each front link 5A is held in a rotational posture in which each front link 5A is slightly forwardly tilted relative to its standing posture and its rotation is stopped when each of the divided seats 1A, 1B is in the use position. Since each front link 5A has the link length longer than each rear link 5B, each front link 5A is set to a state of supporting the seat cushion 3 in a forward ascending angular posture due to the rotation posture.

When each front link 5A is tilted rearward from the state of the use position described with reference to FIG. 3 as shown in FIGS. 4 to 7, the seat cushion 3 is sunk to a position where the seat cushion 3 is substantially bottomed on the underfloor surface F while largely moving toward the rear side due to the long link length of each front link 5A. As shown in FIG. 7, each front link 5A is adapted to be tilted rearward to a position of a rotational posture in which it is substantially fallen on the underfloor surface F.

As shown in FIG. 3, each rear link 5B has a link length shorter than each front link 5A. Each rear link 5B is held in a rotational posture in which each rear link 5B is tilted more forwardly than each front link 5A and its rotation is stopped when each of the divided seats 1A, 1B is in the use position. Since each rear link 5B has the link length shorter than each front link 5A, each rear link 5B is set to a state of supporting the seat cushion 3 in a rearward descending angular posture due to the rotation posture.

When each rear link 5B is tilted rearward from the state of the use position described with reference to FIG. 3 as shown in FIGS. 4 to 7, the seat cushion 3 is sunk to a position where the seat cushion 3 is substantially bottomed on the underfloor surface F while moving toward the rear side. As shown in FIG. 7, each rear link 5B is configured to be tilted rearward to a position of the rotational posture where each rear link 5B is substantially fallen on the underfloor surface F together with each front link 5A. In this way, the seat cushion 3 is set in a state of being sunk on the underfloor surface F in a compact angular posture in which the seat cushion 3 is substantially parallel to the underfloor surface F.

The rear tilt down mechanism 5 includes a control link (not shown) that controls forward tilting so that the seat cushion 2 is gradually folded on the upper surface portion of the seat cushion 3 according to the movement of each front link 5A and each rear link 5B to be tilted rearward. By controlling the forward tilting of the seat back 2 by the rear tilt down mechanism 5, the seat back 2 is adapted to move in such a manner that a part of the rear surface portion 2B thereof enters the lower side of each gap hiding board B while being forwardly tilted around the rotation center 2R as each of the divided seats 1A, 1B is sunk rearward from the state of the use position shown in FIG. 3 to the underfloor storage position as shown in FIGS. 4 to 7.

Figure 4:
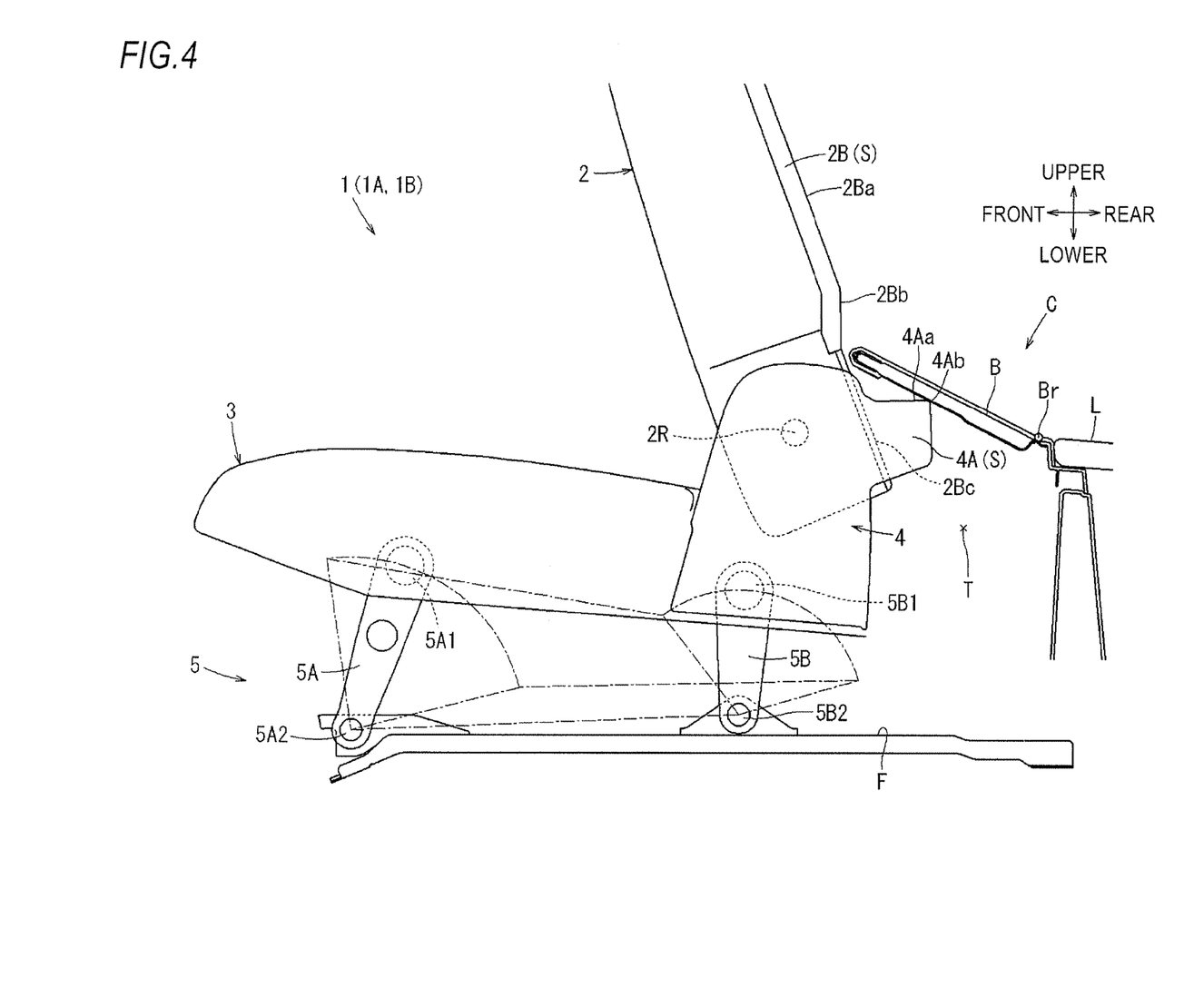
FIG. 4 is a side view showing a state in which a gap hiding board is pushed up by a first support surface portion by backward movement of the seat toward an underfloor storage position.

By the way, as shown in FIG. 4, upon rotating rearward from the state of the use position described with reference to FIG. 3, each rear link 5B once passes through a rotation trajectory in which the rear link 5B stands to a rotational position of the standing posture. With the above standing, each rear link 5B can move a rear end portion of the seat cushion 3 toward the rear side while raising the rear end portion of the seat cushion 3 from the state of the use position described with reference to FIG. 3.

By the standing movement described above, each rear link 5B raises the overhang portion 4A of each side shield 4 assembled to the rear end portion of the seat cushion 3 toward the rear upper side in a substantially horizontal manner. Thus, each gap hiding board B supported on the first support surface 4Aa that is an upper surface of each overhang portion 4A is pushed rearward and upward by a rear upper corner portion 4Ab of each overhang portion 4A, and each gap hiding board B is pushed up around the rotation center Br that is a hinge connection point with the luggage floor L. Here, the rear tilt down mechanism 5 configured to move the first support surface 4Aa toward the rear side while raising the first support surface 4Aa in a substantially horizontal manner by raising each rear link 5B at the initial stage of rotation corresponds to the lifting mechanism in the disclosure.

By pushing up each gap hiding board B, as shown in FIGS. 4 and 5, even when the seat back 2 is moved rearward in a forwardly tilted posture while being tilted forward to a certain extent according to the rearward movement of each of the divided seats 1A, 1B, each of the divided seats 1A, 1B can enter the lower side of each gap hiding board B in a posture in which a leading end portion (front end portion) of each gap hiding board B is pushed up so as to avoid interference without hitting or rubbing against the rear surface portion 2B of the seat back 2.

As shown in FIG. 5, in each of the divided seat 1A, 1B, as each rear link 5B is tilted rearward from the rotational position of its standing posture described with reference to FIG. 4, the rear upper corner portion 4Ab of the overhang portion 4A of each side shield 4 is gradually descended while being moved toward the rear side. At this time, the rear upper corner portion 4Ab of the overhang portion 4A of each side shield 4 is pushed up to a position higher than the rotation center Br of each gap hiding board B in the state of FIG. 4. Therefore, as each of the divided seats 1A, 1B moves rearward, the rear upper corner portion 4Ab of each overhang portion 4A approaches the rotation center Br of each gap hiding board B from the front side toward the rear side and also approaches the rotation center Br in the height direction from the upper side. With this configuration, each of the divided seats 1A, 1B is moved to be sunk rearward and downward while raising each gap hiding board B further upward than the state shown in FIG. 4 by the rear upper corner portion 4Ab of the overhang portion 4A of each side shield 4.

In each of the divided seats 1A, 1B, as shown in FIG. 6, as each rear link 5B is further tilted rearward and downward from the state shown in FIG. 5, each gap hiding board B lifted by the rear upper corner portion 4Ab of the overhang portion 4A of each side shield 4 is guided to be gradually lowered downward and the leading end of each gap hiding board B is put onto the inclined surface 2Bb of the rear surface portion 2B of the seat back 2 in the middle of being tilted forward.

In each of the divided seats 1A, 1B, as shown in FIG. 7, as each rear link 5B is further tilted rearward and downward from the state shown in FIG. 6, the rear upper corner portion 4Ab of the overhang portion 4A of each side shield 4 is separated downward from each gap hiding board B in a region in front of the rotation center Br of each gap hiding board B. In addition, as each of the divided seats 1A, 1B is sunk and the seat back 2 is tilted, each gap hiding board B is slid along the inclined surface 2Bb of the rear surface portion 2B of the seat back 2 and rides on the second support surface 2Bc.

With the series of movement described above, each of the divided seats 1A, 1B moves to be folded and sunk from the use position shown in FIG. 3 to the underfloor storage position shown in FIG. 7, so that each of the gap hiding boards B can be displaced from the state where each of the gap hiding boards B is supported on the first support surface 4Aa of the overhang portion 4A of each side shield 4 to the state where each of the gap hiding boards B is supported on the second support surface 2Bc of the rear surface portion 2B of each seat back 2. The second support surface 2Bc of the rear surface portion 2B of each seat back 2 supporting each gap hiding board B from below in the state of the underfloor storage position shown in FIG. 7 is in the same position and the same orientation as the first support surface 4Aa of the overhang portion 4A of each side shield 4 when each of the divided seats 1A, 1B is in the use position shown in FIG. 3.

Therefore, each of the gap hiding boards B can be supported by each of the second support surface 2Bc on the same position where the gap hiding boards B are supported by the first support surfaces 4Aa when each of the divided seats 1A, 1B is in the use position in FIG. 3. As a result, as shown in FIG. 1, even when one (right divided seat 1A in the figure) of the divided seats 1A, 1B is left in the use position and the other (left divided seat 1B in the figure) is stored in the underfloor storage position, the gap hiding boards B covering the gaps T between the divided seats 1A, 1B and the luggage floor L can be brought into a state in which they are flush with each other on the left and right sides to give good appearance.

As each of the divided seats 1A, 1B moves to return from the underfloor storage position described with reference to FIG. 7 to the use position described with reference to FIG. 3, each of the gap hiding boards B moves from the position on the second support surface 2Bc to the position on the first support surface 4Aa and returns to its original state, in the reverse order to the above.

To summarize the above, the gap hiding structure C of the present embodiment has the following configurations. That is, the gap hiding structure (gap hiding structure C) for the vehicle luggage floor includes the gap hiding board (gap hiding board B) hinged to the vehicle luggage floor (luggage floor L) and configured to cover the gap (gap T) between the luggage floor (luggage floor L) and the seat (rear seat 1) installed on the front side of the luggage floor (luggage floor L), the rear tilt down mechanism (rear tilt down mechanism 5) configured to cause the entire seat (rear seat 1) to be sunk from the use position where the seat is used as the seating part to the underfloor storage position where the seat enters the lower side of the gap hiding board (gap hiding board B) with the forward tilting of the seat back (seat back 2), the support part (support part S) including the first support surface portion (overhang portion 4A) which forms the substantially horizontal plane (support surface 4Aa) and which is brought into contact with the gap hiding board (gap hiding board B) from the lower side to support the gap hiding board (gap hiding board B) to be substantially flush with the luggage floor (luggage floor L) in the state where the seat (rear seat 1) is in the use position, and the second support surface portion (rear surface portion 2B) which is provided at the rear surface portion (rear surface portion 2B) of the seat back (seat back 2), wherein when the seat (rear seat 1) is in the use position, the second support surface portion (rear surface portion 2B) forms the standing surface, and when the seat (rear seat 1) is in the underfloor storage position, the second support surface portion (rear surface portion 2B) forms the substantially horizontal plane (second support surface 2Bc), is configured to come into contact with the gap hiding board (gap hiding board B) from the lower side and support the gap hiding board (gap hiding board B) to be substantially flush with the luggage floor (luggage floor L), and the lifting mechanism (rear tilt down mechanism 5) configured to push up the gap hiding board (gap hiding board B) to the high position at which the gap hiding board is capable of avoiding interference with the second support surface portion (rear surface portion 2B) by bringing the first support surface portion (overhang portion 4A) close to the rotation center (rotation center Br) of the gap hiding board (gap hiding board B) while lifting the first support surface portion (overhang portion 4A) in a substantially horizontal manner according to the rearward movement of the seat (rear seat 1) toward the underfloor storage position.

With the above configuration, when the seat (rear seat 1) enters the underfloor storage position on the lower side of the gap hiding board (gap hiding board B) from the use position with the forward tilting of the seat back (seat back 2), the gap hiding board (gap hiding board B) is pushed up to the high position at which the gap hiding board is capable of avoiding the interference with the second support surface portion (rear surface portion 2B) by the substantially horizontal upward movement of the first support surface portion (overhang portion 4A). With this configuration, the gap hiding board (gap hiding board B) can properly follow the movement of the seat (rear seat 1) to be substantially flush with the luggage floor (luggage floor L) in the use position of the seat (rear seat 1) and the luggage floor (luggage floor L) in the underfloor storage position of the seat (rear seat 1). Here, regarding the "rear tilt down mechanism," that the entire seat is caused to be sunk to the underfloor storage position where the seat enters the lower side of the gap hiding board from the use position where the seat is used as a seating part "with" the forward tilting of the seat back intends to cause the entire seat to be sunk to the underfloor storage position after the forward tilting of the seat back, in addition to cause the entire seat to be sunk to the underfloor storage position concurrently with the forward tiling of the seat back.

Further, the first support surface portion (overhang portion 4A) is the overhang portion (overhang portion 4A) protruding to the rear side of the seat cushion (seat cushion 3) of the seat (rear seat 1). The rear upper corner portion (corner portion 4Ab) of the overhang portion (overhang portion 4A) is configured to come into contact with the gap hiding board (gap hiding board B) and push up the gap hiding board (gap hiding board B) to the high position according to the rearward movement of the seat (rear seat 1) toward the underfloor storage position.

With the above configuration, the gap hiding board (gap hiding board B) can be efficiently pushed up to the high position by the rear upper corner portion (corner portion 4Ab) of the first support surface portion (overhang portion 4A) closest to the rotation center (rotation center Br) of the gap hiding board (gap hiding board B) according to the rearward movement of the seat (rear seat 1) toward the underfloor storage position.

Further, the first support surface portion (overhang portion 4A) is configured to push up the gap hiding board (gap hiding board B) to the high position according to the rearward movement of the seat (rear seat 1) toward the underfloor storage position, and then, the contact state of the first support surface portion (overhang portion 4A) with the gap hiding board (gap hiding board B) is separated downward in the region in front of the rotation center (rotation center Br) of the gap hiding board (gap hiding board B).

With the above configuration, in accordance with the rearward movement of the seat (rear seat 1) toward the underfloor storage position, the gap hiding board (gap hiding board B) can be pushed up to the high position and then can be gradually lowered according to the decent of the first support surface portion (overhang portion 4A).

Further, the second support surface portion (rear surface portion 2B) is disposed at the position higher than the first support surface portion (overhang portion 4A) when the seat (rear seat 1) is in the underfloor storage position.

With the above configuration, the height position of the second support surface portion (rear surface portion 2B) when the seat (rear seat 1) is in the underfloor storage position can be brought close to the height position of the first support surface portion (overhang portion 4A) when the seat (rear seat 1) is in the use position, so that the gap hiding board (gap hiding board B) can be supported to be substantially flush with the second support surface portion (rear surface portion 2B).

Further, the rear tilt down mechanism includes the rear link rotatably connected to the seat cushion and the underfloor surface of the vehicle. The rear link is in a first position forwardly tilted when the seat is in the use position, in a second position that is in standing posture when the seat moves rearward toward the underfloor storage position, and in a third position substantially rearwardly tilted when the seat is in the underfloor storage position. The lifting mechanism is configured by the rear tilt down mechanism having a configuration that is configured to move the first support surface rearward while raising the first support surface by rotating and lifting the rear link from the first position to the second position.

Other Embodiments

Although the embodiments of the disclosure have been described using one embodiment, the disclosure can be implemented in various forms other than the above embodiment. For example, the gap hiding structure for the vehicle luggage floor of the disclosure may be widely applied to seats provided for various vehicles other than automobiles, such as trains, aircrafts or ships. Further, although the gap hiding structure of the disclosure is adapted to cover the gap between the luggage floor and the rear seat arranged at the last row of a vehicle with multiple rows of seats, the gap hiding structure of the disclosure may be applied to a vehicle with only one row of seats.

Further, as in the configuration described in the above embodiment, the lifting mechanism (lifting mechanism configured to push up the gap hiding board to the high position at which the gap hiding board is capable of avoiding interference with the second support surface portion by bringing the first support surface portion close to the rotation center of the gap hiding board while lifting the first support surface portion in a substantially horizontal manner according to the rearward movement of the seat toward the underfloor storage position) can be configured by the rear tilt down mechanism for lifting the rear link at the initial stage of rotation. However, the lifting mechanism may be configured by a separate interlocking mechanism for separately lifting the first support surface portion in conjunction with the movement of the rear tilt down mechanism.

Further, the rear tilt down mechanism may be configured to cause the entire seat to be sunk from the use position where the seat is used as the seating part to the underfloor storage position where the seat enters the lower side of the gap hiding board concurrently with the forward tilting of the seat back.

Further, although the first support surface portion and the second support surface portion for supporting the gap hiding board can support the gap hiding board in a flat surface shape, the first support surface portion and the second support surface portion may support the gap hiding board on a curved surface in a point shape or a line shape.

Further, although the first support surface portion can be provided on a member integrated with a seat cushion, such as a side shield described in the above embodiment, the first support surface portion may be provided on a seat back.

Further, the second support surface portion may be provided on a member integrated with a seat cushion other than the seat back.

Further, the first support surface portion and the second support surface portion may be made of only a resin structure having no strength member therein such as a frame.

Further, the rear tilt down mechanism and the lifting mechanism may be configured by an operation structure such as a feed screw mechanism other than a link mechanism.

Further, although the gap hiding board hinged to the luggage floor can be integrally hinged to the luggage floor, the gap hiding board may be hinged to the luggage floor via a separate member such as a hinge.

What is claimed is:

1. A gap hiding structure for a vehicle luggage floor comprising:
   a gap hiding board hinged to the vehicle luggage floor and configured to cover a gap between the luggage floor and a seat installed on a front side of the luggage floor;
   a rear tilt down mechanism configured to cause the entire seat to be sunk from a use position where the seat is used as a seating part to an underfloor storage position where the seat enters a lower side of the gap hiding board with a forward tilting of a seat back;
   a support part configured to come into contact with and support the gap hiding board, the support part including:
      a first support surface portion which forms a substantially horizontal plane, and which is configured to come into contact with the gap hiding board from the lower side of the gap hiding board and support the gap hiding board to be substantially flush with the luggage floor in a state where the seat is in the use position; and
      a second support surface portion which is provided at a rear surface portion of the seat back, wherein when the seat is in the use position, the second support surface portion forms a standing surface, and when the seat is in the underfloor storage position, the second support surface portion forms a substantially horizontal plane, is configured to come into contact with the gap hiding board from the lower side of the gap hiding board and support the gap hiding board to be substantially flush with the luggage floor; and
   a lifting mechanism configured to push up the gap hiding board to a high position at which the gap hiding board is capable of avoiding interference with the second support surface portion by bringing the first support surface portion close to a rotation center of the gap hiding board while lifting the first support surface portion in a substantially horizontal manner according to a rearward movement of the seat toward the underfloor storage position.

2. The gap hiding structure for the vehicle luggage floor according to claim 1,
   wherein the first support surface portion is an overhang portion protruding to a rear side of a seat cushion of the seat, and
   wherein a rear upper corner portion of the overhang portion is configured to come into contact with the gap hiding board and push up the gap hiding board to the high position according to the rearward movement of the seat toward the underfloor storage position.

3. The gap hiding structure for the vehicle luggage floor according to claim 2,
   wherein the first support surface portion is configured to push up the gap hiding board to the high position according to the rearward movement of the seat toward the underfloor storage position, and then, a contact state of the first support surface portion with the gap hiding board is separated downward in a region at a front side of the rotation center of the gap hiding board.

4. The gap hiding structure for the vehicle luggage floor according to claim 1,
   wherein the second support surface portion is disposed at a position higher than the first support surface portion when the seat is in the underfloor storage position.

5. The gap hiding structure for the vehicle luggage floor according to claim 1,
   wherein the rear tilt down mechanism includes a rear link rotatably connected to the seat cushion and an underfloor surface of the vehicle,
   wherein the rear link is in a first position forwardly tilted when the seat is in the use position, in a second position that is in standing posture when the seat moves rearward toward the underfloor storage position, and in a third position rearwardly tilted when the seat is in the underfloor storage position, and
   wherein the lifting mechanism is configured by the rear tilt down mechanism having a configuration that is configured to move the first support surface rearward while raising the first support surface by rotating and lifting the rear link from the first position to the second position.

* * * * *

UNITED STATES PATENT AND TRADEMARK OFFICE
CERTIFICATE OF CORRECTION

PATENT NO. : 10,358,058 B2  
APPLICATION NO. : 15/935332  
DATED : July 23, 2019  
INVENTOR(S) : Nobutaka Matsunami et al.

Page 1 of 1

It is certified that error appears in the above-identified patent and that said Letters Patent is hereby corrected as shown below:

On the Title Page

Item (72) Inventors please change:
"Nobutaka Matsunami, Aichi-ken, (JP); Junichiro Nozue, Aichi-ken (JP)"

To:
Nobutaka Matsunami, Aichi-ken, (JP); Junichiro Nozue, Aichi-ken (JP); Toshitsugu Shimizu, Aichi-ken, (JP); Yusuke Futamura, Aichi-ken, (JP); Takahiro Sugiyama, Aichi-ken, (JP); Nobuhiro Ota, Aichi-ken, (JP); Mitsuru Sato, Aichi-ken, (JP)

Signed and Sealed this  
Fourth Day of August, 2020

Andrei Iancu  
*Director of the United States Patent and Trademark Office*